US010904851B1

(12) United States Patent
Henry et al.

(10) Patent No.: US 10,904,851 B1
(45) Date of Patent: Jan. 26, 2021

(54) SYSTEMS AND METHODS FOR DETERMINING LOCATIONS OF ACCESS POINTS

(71) Applicant: Cisco Technology, Inc., San Jose, CA (US)

(72) Inventors: Jerome Henry, Pittsboro, NC (US); Pooya Monajemi, Irvine, CA (US); Santosh Ghanshyam Pandey, Fremont, CA (US); Jean-Philippe Marcel Vasseur, Saint Martin d'Uriag (FR)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 16/748,565

(22) Filed: Jan. 21, 2020

(51) Int. Cl.
*H04W 16/18* (2009.01)
*H04W 64/00* (2009.01)

(52) U.S. Cl.
CPC .......... *H04W 64/003* (2013.01); *H04W 16/18* (2013.01)

(58) Field of Classification Search
CPC . H04W 64/00; H04W 64/003; H04W 64/006; H04W 84/12; H04W 88/08; H04W 12/1204; H04W 24/10; H04W 4/025; H04W 8/02; H04W 16/14; H04W 16/18
See application file for complete search history.

(56) References Cited

U.S. PATENT DOCUMENTS

| | | | |
|---|---|---|---|
| 9,298,992 B2 * | 3/2016 | Harada | G06K 9/00523 |
| 9,301,100 B1 * | 3/2016 | Jampani | G01S 5/0278 |
| 9,769,626 B2 | 9/2017 | Bajko et al. | |
| 9,781,698 B2 | 10/2017 | Venkatraman et al. | |
| 10,009,430 B2 | 6/2018 | Eyal et al. | |
| 2006/0227745 A1 * | 10/2006 | Olvera-Hernandez | H04W 4/029 370/331 |
| 2011/0194442 A1 * | 8/2011 | Narasimhan | H04W 36/0061 370/252 |
| 2012/0129556 A1 * | 5/2012 | Tysowski | H04L 51/04 455/466 |
| 2012/0184219 A1 * | 7/2012 | Richardson | H04W 64/006 455/67.11 |
| 2013/0172005 A1 * | 7/2013 | Finlow-Bates | H04W 64/003 455/456.1 |
| 2014/0187250 A1 * | 7/2014 | Kolavennu | H04W 16/18 455/446 |

(Continued)

*Primary Examiner* — Jean A Gelin
(74) *Attorney, Agent, or Firm* — Lee & Hayes, P.C.

(57) ABSTRACT

A system may be configured to identify, from among a plurality of access points in an area in communication with a network, a plurality of edge access points associated with an edge of the area. In addition, the system may also be configured to determine first edge location-related data for a first edge access point and first interior location-related data for a first interior access point. Determining the first interior location-related data for the first interior access point includes exchanging ranging data indicative of a first relative distance between the first edge access point and the first interior access point. The ranging data may be based at least in part on fine timing measurements and/or time-of-flight-based measurements. Determining the first interior location-related data for the first interior access point may also include communicating the first edge location-related data from the first edge access point to the first interior access point.

20 Claims, 11 Drawing Sheets

(56) References Cited

U.S. PATENT DOCUMENTS

| | | | |
|---|---|---|---|
| 2014/0206379 A1* | 7/2014 | Mayor | H04W 64/006 455/456.1 |
| 2014/0235266 A1* | 8/2014 | Edge | H04W 64/00 455/456.1 |
| 2014/0235280 A1* | 8/2014 | Edge | H04W 48/16 455/456.6 |
| 2015/0346313 A1* | 12/2015 | Smith | G01S 5/0252 342/465 |
| 2016/0334498 A1* | 11/2016 | Jamieson | G01S 5/04 |
| 2017/0013588 A1 | 1/2017 | Prechner et al. | |
| 2017/0064723 A1* | 3/2017 | Armstrong | H04W 76/38 |
| 2019/0086212 A1* | 3/2019 | Koshy | G01C 21/32 |
| 2019/0159162 A1* | 5/2019 | Hassan | G01S 5/0205 |
| 2019/0297595 A1 | 9/2019 | Sirotkin et al. | |
| 2020/0109850 A1* | 4/2020 | Gauthier | F21V 29/503 |

* cited by examiner

SYSTEMS AND METHODS FOR DETERMINING LOCATIONS OF ACCESS POINTS

TECHNICAL FIELD

The present disclosure relates generally to systems and methods for determining the locations of access points in a geographic area, such as a building or other structure.

BACKGROUND

Network systems may include a number of access points in a geographic area, such as a building or other structure. Access points are hardware devices that facilitate connection of wireless devices to a hard-wired network in the geographic area. For example, a building may include one or more networks for communication of data between different devices associated with the one or more networks. Some buildings may include a relatively large number of access points installed throughout the building, often in locations that are not readily apparent. In some instances, the locations of the access points may be recorded at the time of installation of the access points. However, some locations may be inaccurately recorded at the time of installation. In addition, over time some access points may be moved, resulting in the location of the access points changing, and further, access points may be added to a network, for example, as the size of an organization grows. As a result, it may be difficult and time consuming to find the access points, rendering performance of service or maintenance associated with access points difficult.

Therefore, it may be advantageous to develop techniques to determine the locations of access points in a geographic area.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
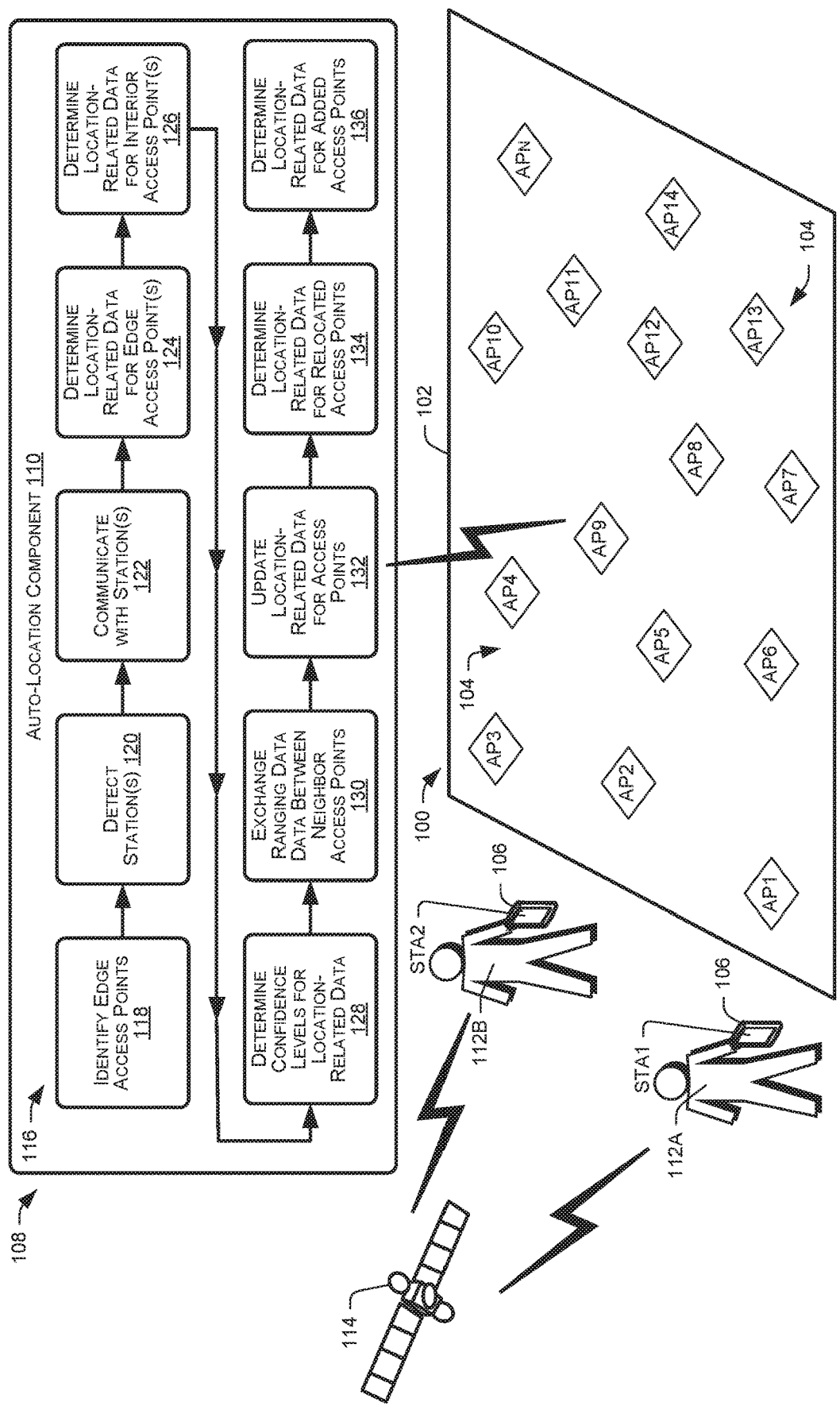
FIG. 1 illustrates an example environment including an example geographic area including a plurality of access points, a pair of example stations associated with the geographic area, and an example auto-location component of a system for performing a process of determining the locations for at least some of the access points in the geographic area.

This disclosure describes, in part, a system configured to identify, via an auto-location component, from among a plurality of access points in an area in communication with a network, a plurality of edge access points associated with an edge of the area. In addition, the system may also be configured to determine first edge location-related data for a first edge access point of the plurality of edge access points, and determine first interior location-related data for a first interior access point of the plurality of access points. Determining the first interior location-related data for the first interior access point may include exchanging ranging data indicative of a first relative distance between the first edge access point and the first interior access point. The ranging data may be based at least in part on at least one of fine timing measurements or time-of-flight-based measurements. Determining the first interior location-related data for the first interior access point may also include communicating the first edge location-related data from the first edge access point to the first interior access point.

Additionally, the techniques described herein may be performed via a method and/or non-transitory computer-readable media storing computer-executable instructions that, when executed by one or more processors, performs methods described herein.

Example Embodiments

As noted above, network systems may include a number of access points in a geographic area, such as a building or other structure. For example, a building may include one or more networks for communication of data between different devices associated with the one or more networks, and some buildings may include a relatively large number access points throughout the building, often in locations that are not readily apparent. For a number of reasons, it may be difficult and time consuming to find the access points, rendering performance of service or maintenance associated with access points difficult.

IEEE 802.11az and 802.11-2016 (fine timing measurements (FTM)) facilitate exchange of ranging messages between two stations, for example, between a smartphone and an access point, so that relative positions between the two stations may be determined. However, the ranging message exchange may only be useful for location-based services if the location of at least one of the two stations is known. However, if neither of the locations is known, although a first one of the stations may be able to determine its relative distance from the second of the stations, it is not possible, without more information, to determine the location of the first station based on the ranging message exchange between the two stations. The above-referenced protocols facilitate for either one of the two stations to communicate geo-coordinates information in a field called Location Configuration Information (LCI). However, the LCI does not facilitate determination of the location of the two stations without additional information, such as the location of one of the two stations. For example, the first station (e.g., a smartphone) needs the LCI from the second station (e.g., an access point), but the second station, being an indoor access point, has no location-determining mechanism (e.g., a GPS system) to provide the LCI.

Thus, this disclosure describes techniques for determining location-related data associated with a plurality of access points in a geographic area, such as a building. For example, a system may be configured to determine location-related data for a plurality of access points in a geographic area in communication with a network. In some examples, the location-related data may be determined by an exchange of data between one or more stations and at least some of the access points. For example, this disclosure describes techniques for generating LCI data from a seed exchange between stations (e.g., between smartphones and access points), and, in some examples, facilitates substantially continuous learning to increase the location parameters. In some examples, the system may result in an ability for access points to self-locate one another on a common level of a geographic location, such as the floor of a building.

In some examples, a system may be configured to identify, via an auto-location component, from among a plurality of access points in an area in communication with a network, a plurality of edge access points associated with an edge of the area. The system may also be configured to determine first edge location-related data for a first edge access point of the plurality of edge access points, and determine first interior location-related data for a first interior access point of the plurality of access points. In some examples, determining the first interior location-related data for the first interior access point may include exchanging ranging data indicative of a first relative distance between the first edge access point and the first interior access point, wherein the ranging data may be based at least in part on fine timing measurements (FTM) and/or time-of-flight-based measurements. Determining the first interior location-related data for the first interior access point may also include communicating the first edge location-related data from the first edge access point to the first interior access point.

In some examples, identifying the plurality of edge access points associated with the edge of the area may include determining a number of neighbor access points for at least some of the plurality of access points, and identifying as edge access points, from among the at least some of the plurality of access points, access points having a minimum number of neighbor access points. In some examples, identifying the plurality of edge access points may include identifying as edge access points, access points that are first to detect a presence of a station configured to communicate with at least some of the plurality of access points. In still other examples, identifying the plurality of edge access points may include identifying as edge access points, access points that lack neighbor access points in an at least one-hundred-eighty-degree area surrounding the access point. In some examples, this may be performed by an auto-location component (e.g., an auto-location engine) operating on Connected Mobile Experience™ (CMX) (and/or any other engine configured to determine station and/or access point locations and/or represent at least some of the locations on a map), which may be configured to collect data associated with the access points and detect access points at the edge of the geographic location, such as the periphery of the interior of a building.

In some examples, determining the first edge location-related data for the first edge access point of the plurality of edge access points may include detecting, via the first edge access point, a presence of a first station configured to communicate with at least some of the plurality of access points. The first station may be a mobile device, such as, for example, a smartphone or tablet. Determining the first edge location-related data may also include initiating, via the first edge access point, communication with the first station, and determining first station ranging data indicative of a first station relative distance between the first station and the first edge access point. In some examples, the first station ranging data may be based at least in part on fine timing measurements (FTM) and/or time-of-flight-based measurements. Determining the first edge location-related data may also include communicating first station location-related data to the first edge access point, such as, for example, LCI associated with the first station. The first station location-related data may include one or more of a first station location of the first station, a first confidence level associated with an accuracy of the first station location, or a first timestamp associated with a first time period between a determination time at which determination of the first station location occurred and a communication time at which the first station location-related data is communicated to the first edge access point. For example, the first edge access point may retrieve LCI associated with the first station from the first station.

In some examples, determining the first edge location-related data may also include detecting, via the first edge access point, a presence of a second station configured to communicate with at least some of the plurality of access points. The second station may also include a mobile device. Determining the first edge location-related data may also include initiating, via the first edge access point, communication with the second station, and determining second station ranging data indicative of a second station relative distance between the second station and the first edge access point. In some examples, the second station ranging data may be based at least in part on FTM. Determining the first edge location-related data may also include communicating second station location-related data to the first edge access point, such as, for example, LCI associated with the second station. The second station location-related data may include one or more of a second station location of the second station, a second confidence level associated with an accuracy of the second station location, or a second timestamp associated with a second time period between a determination time at which determination of the second station location occurred and a communication time at which the second station location-related data is communicated to the first edge access point. For example, the first edge access point may retrieve LCI associated with the second station from the second station.

In some examples, the system may be configured to determine a first circle having a first center at least partially defined by the first station location and a first radius at least partially defined by the first station relative distance. The system may also be configured to determine a second circle having a second center at least partially defined by the second station location and a second radius at least partially defined by the second station relative distance. The system may further be configured to identify as the first edge access point location an intersection of the first circle and the second circle with one another.

In some examples, the first station location-related data may include a first confidence level associated with the accuracy of the first station location and/or the second station location-related data may include a second confidence level associated with the accuracy of the second station location. In some such examples, the system may also be configured to determine, based at least in part on the first confidence level and/or the second confidence level, a first edge access point confidence level associated with an accuracy of the first edge access point location. In some such examples, the first circle may include a first inner radius and a first outer radius at least partially indicative of the first confidence level, and the second circle may include a second inner radius and a second outer radius at least partially indicative of the second confidence level. In some such examples, identifying as the first edge access point location the intersection of the first circle and the second circle with one another may include identifying as the first edge access point location an intercept centroid with respect to the first circle and the second circle.

In some examples of the system, the system may be configured to determine edge location-related data for located edge access points of at least some of the plurality of edge access points, and determine interior location-related data for located interior access points of a plurality of interior access points, for example, by exchanging ranging data and location-related data between neighboring access points. In some examples, this may include initiating exchange of ranging data between (1) neighboring located edge access points; (2) between located edge access points and neighboring located interior access points; (3) and/or between neighboring located interior access points. In some examples, the system may be configured to update, based at least in part on exchanged ranging data, location-related data for the plurality of edge access points and the plurality of interior access points. In some examples, the updating may be performed substantially continuously until, for example, the location-related data for the access points achieves a threshold confidence level. In addition, in some examples, the system may be configured to automatically determine, via the auto-location component, location-related data for one or more of the plurality of access points upon relocation of the one or more access points, and/or automatically determine, via the auto-location component, location-related data for one or more of additional access points added to the plurality of access points.

In some examples, at least some of the example processes described above may be executed by a machine-learning-trained analytical model. For example, the auto-location component may execute the analytical model.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 including an example geographic area 102 including a plurality of access points 104 (e.g., AP1, AP2, AP3, . . . APn), a pair of example stations 106 (e.g., STA1 and STA2) associated with the geographic area 102, and an example system 108 including an example auto-location component 110 for performing a process of determining the location-related data for at least some of the access points 104 in the geographic area 102. The geographic area 102 may include any area in which one or more networks are deployed, such as, for example, a building or other structure. The access points 104 may include any hardware devices that create a wireless local area network (WLAN), for example, that facilitates connection of wireless devices to a hard-wired network in the geographic area 102. Other types of access point devices are contemplated.

The stations 106 may include any mobile computing device configured to be transported, for example, by a respective person 112A and 112B, and configured to wirelessly communicate with one or more of the access points 104, for example, to gain access to the one or more networks in the geographic area 102. The stations 106 may be configured to communicate with one or more of the access points 104 via any known wireless communication protocols, such as, for example, Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), packet switched core networks (PS-CN), any protocols associated with IEEE 802.11, and/or Ultra-Wide band (UWB) (e.g., any form associated with IEEE 802.15.4, 802.15.4a, and/or 802.15.4z). Also included are various generation wireless technologies. Any other known or anticipated wireless protocols and technologies may be used. The stations 106 may any type of mobile computing device, such as, for example, computers, network devices, internet appliances, tablet computers, PDAs, wireless phones, smartphones, pagers, etc. Other types of stations and/or protocols are contemplated.

As shown in FIG. 1, one or more of the stations 106 may be in wireless communication with one or more global positioning system (GPS) satellites 114 (e.g., three or more GPS satellites) to assist with providing the position and/or orientation of each of the stations 106. Other forms and/or devices for determining the location and/or orientation of the stations 106 are contemplated. For example, one or more of the stations 106 may include one or more accelerometers, one or more gyroscopes, and/or one or more inertial measurement units for replacing and/or supplementing the location and/or orientation determined via communication with the GPS satellites 114, for example, when stations 106 are unable to communicate with the GPS satellites 114 or signals from the GPS satellites 114 are weak, corrupted, and/or otherwise result in inaccurate location/orientation information.

As noted above, a system 108 for determining the location-related data associated with one or more of the access points 104 may include an auto-location component 110 configured to coordinate determination of the location-related data associated with one or more of the plurality of access points 104 in the geographic area 102. FIG. 1 includes a block diagram showing an example process 116 that may be performed by the auto-location component 110 in association with communications between the GPS satellites 114 and one of more of the stations 106, and between the stations 106 and at least some of the plurality of access points 104.

Figure 3:
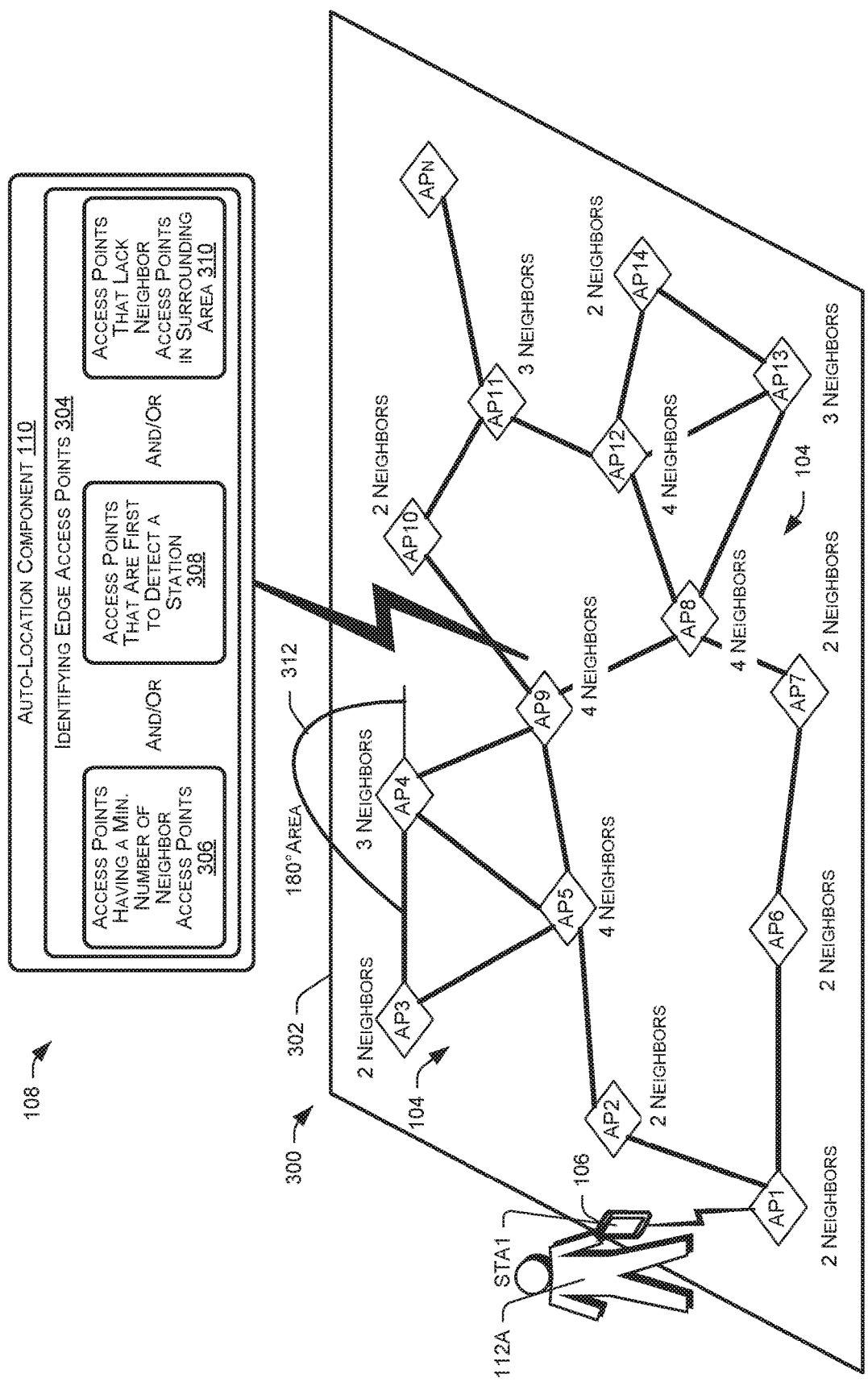
FIG. 3 illustrates an example environment including an example geographic area including a plurality of access points, an example station, and an example auto-location component of a system for performing a process for identifying edge access points from among a plurality of access points in the geographic area.

As shown FIG. 1, the example process 116, at 118, may include identifying one or more edge access points from among the plurality of access points 104 located in the geographic area 102, for example, as discussed herein with respect to FIG. 3. Edge access points may include any access points 104 located along or in the vicinity of the periphery of the geographic area 102 (e.g., the interior of a building). Once one or more of the edge access points are identified, at 120, the example process 116 may include detecting, via one or more of the edge access points, one of more of the stations 106, for example, as described herein with respect to FIG. 4. At 122, the process 116 may include one or more of the edge access points communicating with one or more of the stations 106 to determine location-related data associated with the one or more stations 106 and based at least in part on the location-related data associated with the one or more stations 106. At 124, the example process 116 may include determining location-related data for one or more of the edge access points, for example, as described herein with respect to FIGS. 5-7. In some examples, the location-related data associated with the stations STA1 and/or STA2 may include the position of the respective station, the distance between the respective station and a respective edge access point, for example, as described herein with respect to FIGS. 5 and 6. In some examples, the location-related data associated with the respective edge access points may include identification of a location of the respective access point. At 126, the example process 116 may include determining location-related data for one or more of interior access points from among the plurality of access points 104, for example, as discussed herein with respect to FIG. 8. In some examples, the location-related data associated with the respective interior access points may include identification of a location of the respective access point. In some examples, the interior access points may include any access points that are not identified as edge access points, for example, as discussed with respect to FIG. 3.

Figure 7:
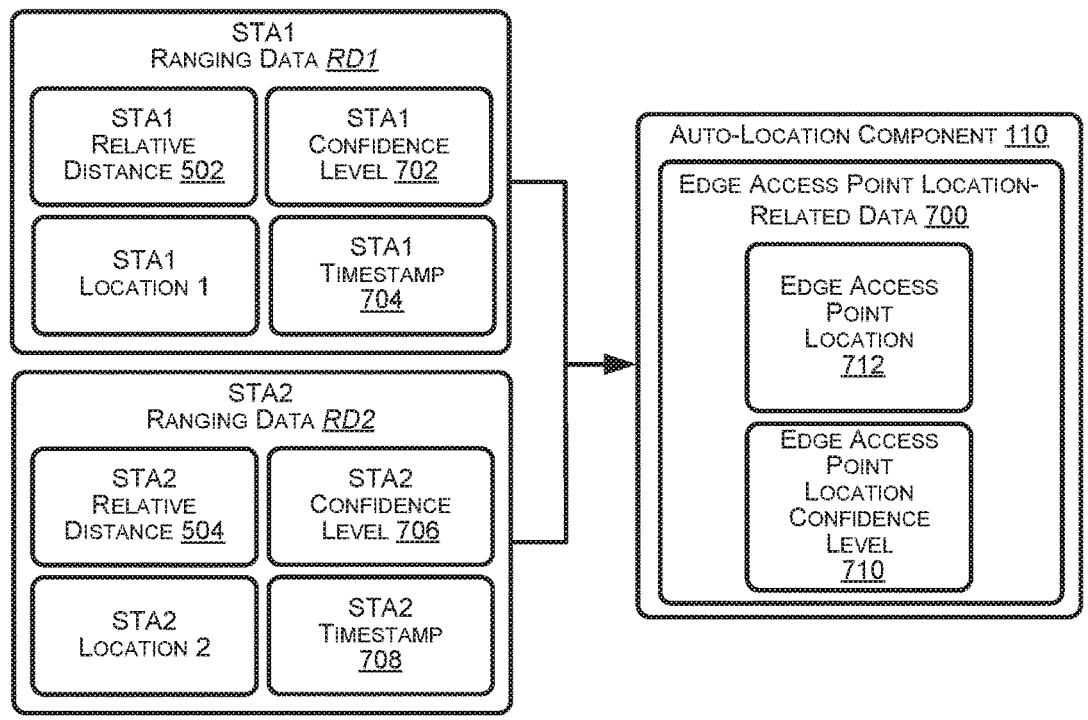
FIG. 7 illustrates the example environment shown in FIGS. 4-6 and another example process for using the ranging data exchanges to determine location-related data for the edge access point, including confidence levels and time-stamps associated with the ranging data.
Figure 7:
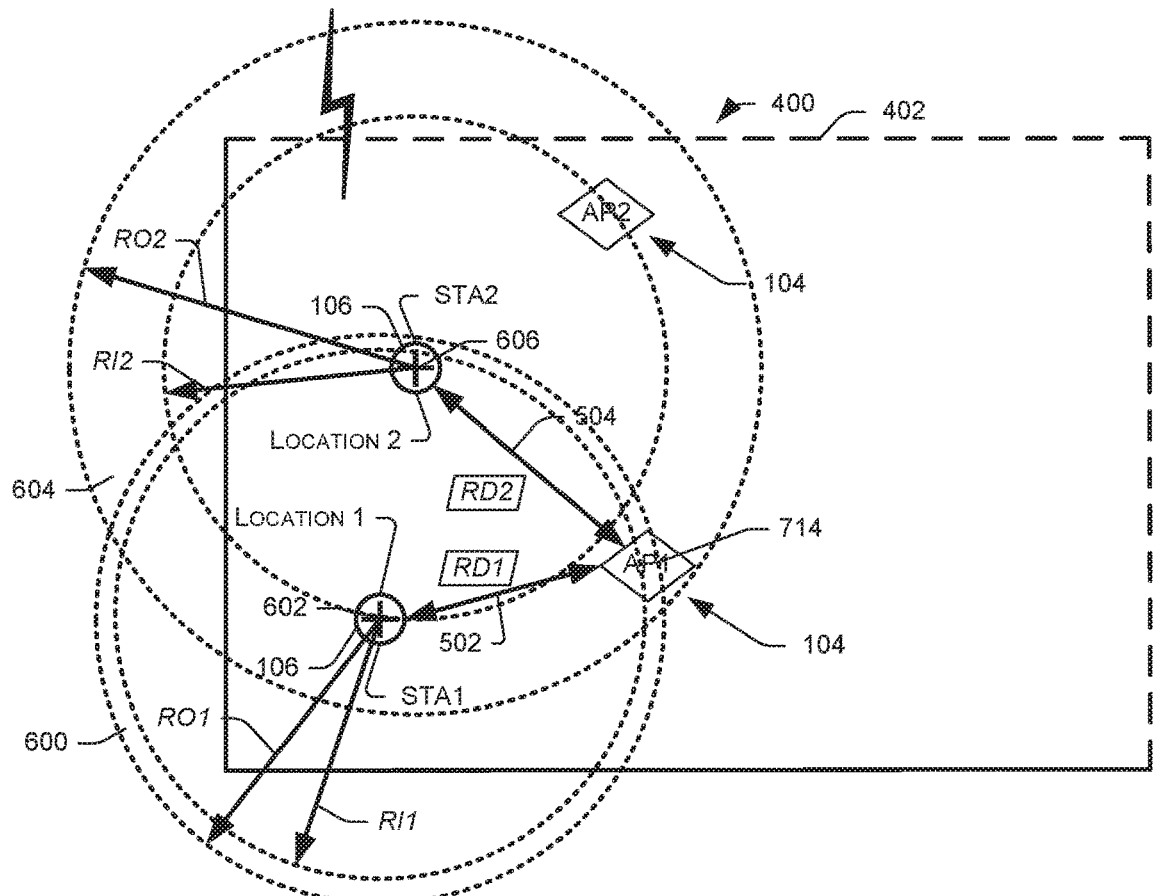
Figure 8:
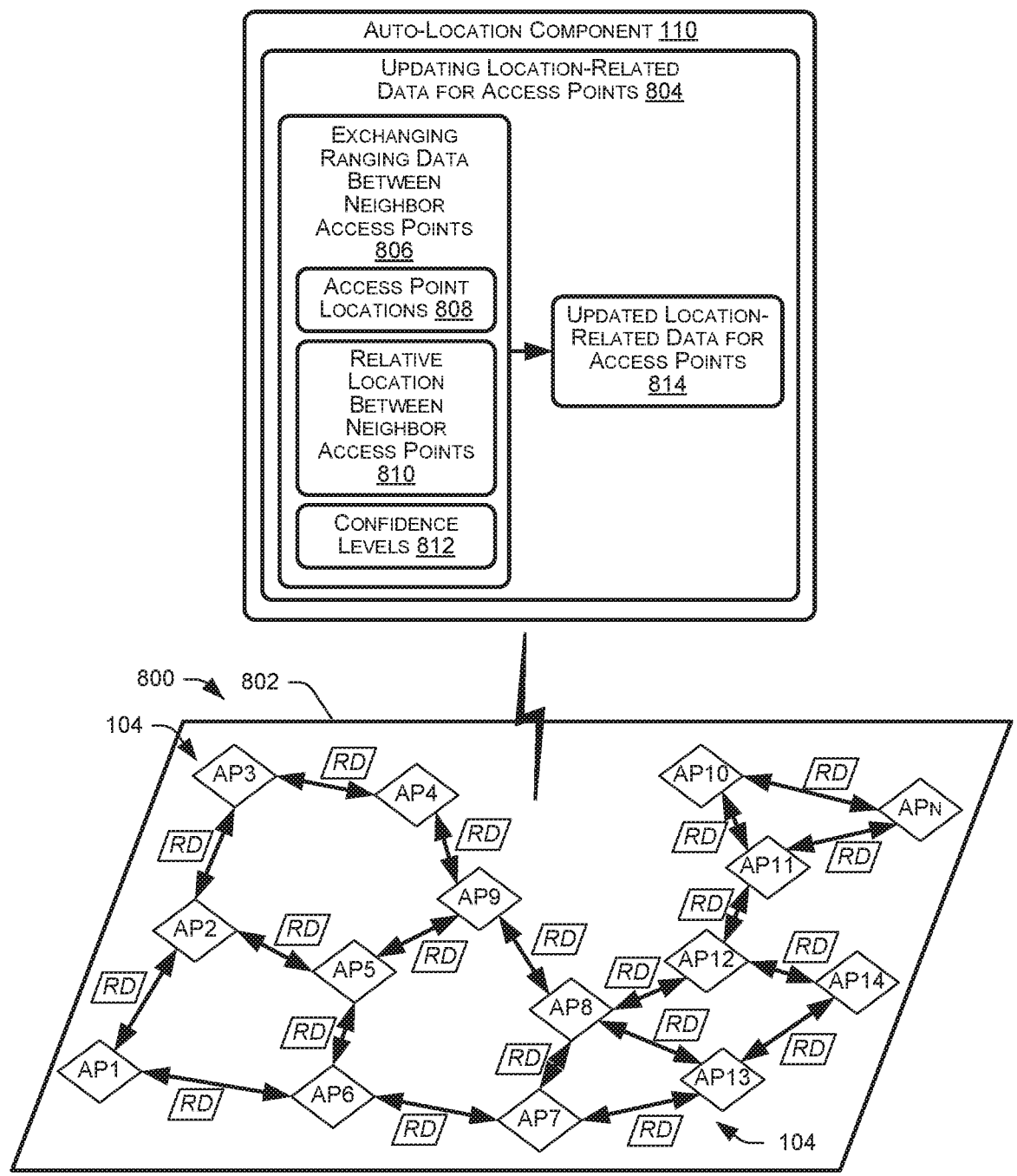
FIG. 8 illustrates an example environment including an example geographic area including a plurality of access points exchanging ranging data between neighbor access points and a block diagram of an example process for updating location-related data associated with at least some of the access points based on the exchange of ranging data.

As shown in FIG. 1, in some examples, the example process 116, at 128, may include determining confidence levels for the location-related data, for example, associated with one or more of the stations STA1 or STA2, with one or more of the edge access points, and/or for one or more of the interior access points, for example, as described herein with respect to FIGS. 7 and 8. At 130, some examples of the process 116 may include exchanging ranging data between neighbor access points, for example, as discussed with respect to FIG. 8. In some examples, ranging data may include one or more of locations of the neighbor access points, relative locations between neighbor access points, or confidence levels associated with the relative locations between the respective neighbor access points. In some examples, neighbor access points may be access points within a threshold distance of one another based at least partially on, for example, signal strength associated with signals communicated between the access points 104, for example, as discussed herein with respect to FIG. 3. At 132, some examples of the process 116 may include updating the location-related data associated with one or more of the access points 104 based at least in part on the exchanges of ranging data between the access points 104 at 130, for example, as discussed herein with respect to FIG. 8.

As shown in FIG. 1, in some examples, the process 116 may also include, at 134, determining location-related data for relocated access points. For example, one or more of the access points 104 may be relocated, for example, due to changes to the geographic location (e.g., changes to the interior of a building and/or repositioning the access point(s) 104 due to additions or subtractions of access points). Some examples of the process 116 may include determining the locations of relocated access points, for example, as discussed herein with respect to FIG. 8. In some examples, the process 116, at 136, may include determining location-related data for added access points, for example, as discussed with respect to FIG. 8.

Figure 2:
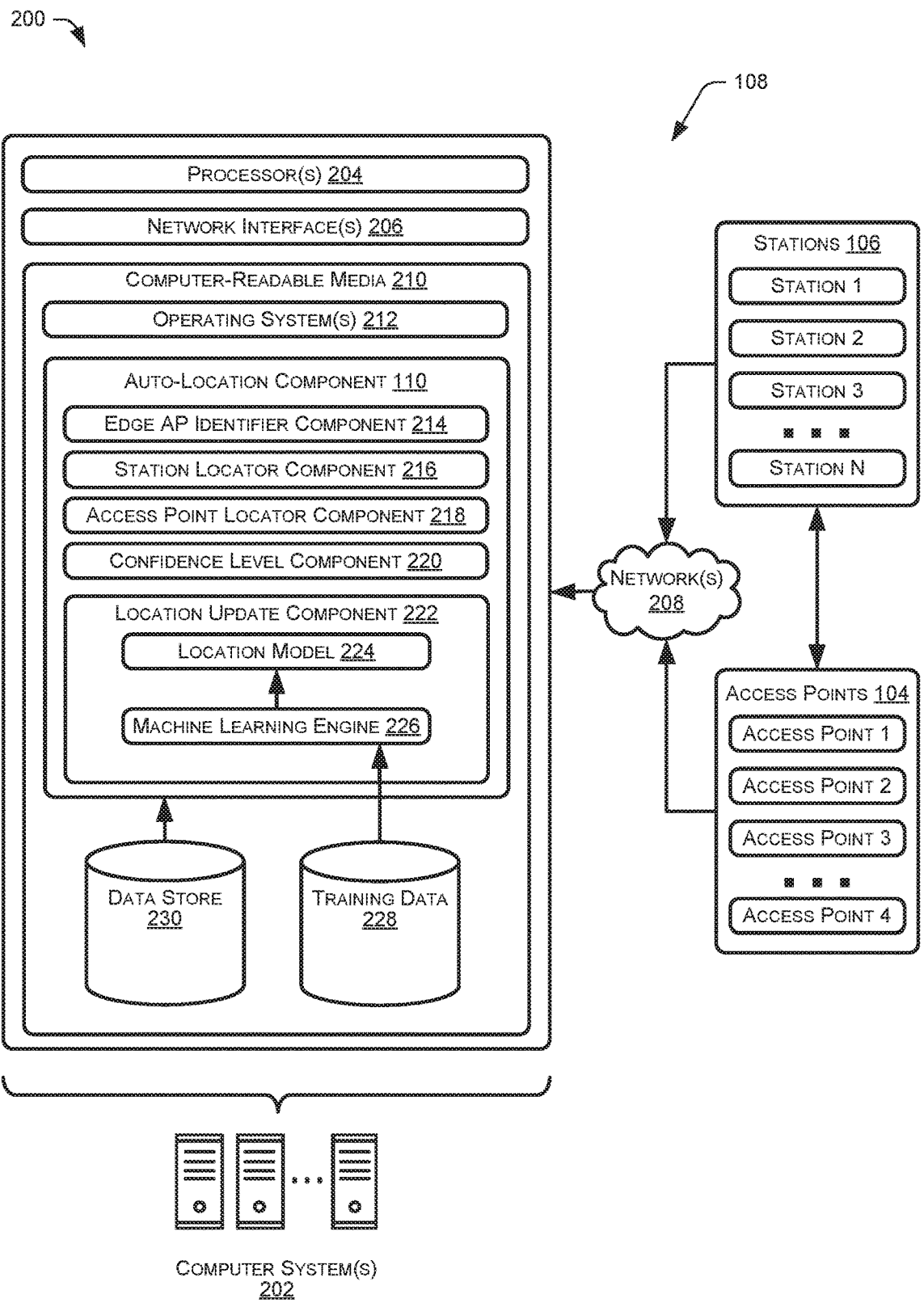
FIG. 2 is a component diagram illustrating example components of an example system for determining the locations of at least some access points located in a geographic area.

FIG. 2 is a component diagram 200 illustrating example components of an example system 108 for determining the location-related data associated with at least some access points 104 located in a geographic area 102. As illustrated, the system 108 may include one or more computer system(s) 202, which may include one or more hardware processor(s) 204 configured to execute one or more stored instructions. The processor(s) 204 may include one or more cores, and the computer system(s) 202 may include one or more network interface(s) 206 configured to provide communications between the computer system(s) 202 and other devices, such as the access points 104 and/or the stations 106, for example, via one or more network(s) 208. The network interface(s) 206 may include devices configured to couple to personal area networks (PANs), wired and wireless local area networks (LANs), wired and wireless wide area networks (WANs), and so forth. For example, the network interface(s) 206 may include devices compatible with Ethernet, Wi-Fi™, Ultra-Wide band (UWB), and so forth.

The computer system(s) 202 may include computer-readable media 210 that stores one or more operating system(s) 212. The operating system(s) 212 may generally support basic functions of the devices of the computer system(s) 202, such as scheduling tasks on the devices, executing applications on the devices, controlling peripheral devices, and so forth. The computer-readable media 210 may further store the auto-location component 110 that is configured to, when executed by the processor(s) 204, perform at least the functions described herein.

In some examples, the auto-location component 110 may include an edge AP identifier component 214 configured to identifier edge access points from among the plurality of access points 104 in a geographic area 102, for example, as described herein. The auto-location component 110 may also include a station locator component 216 configured to identify respective locations of respective stations 106, for example, based on communications between the access points 104 and the stations 106, which may be via the one or more network(s) 208 and/or directly via respective transceivers associated with the access points 104 and the stations 106, for example, as described herein. In some examples, the auto-location component 110 may also include an access point locator component 218 configured to determine and/or update the respective location-related data associated with one or more of the access points 104, for example, as described herein. The auto-location component 110 may, in some examples, also include a confidence level component 220 configured to determine confidence levels associated with the location-related data associated with the access points 104 and/or the stations 106, for example, as described herein.

As shown in FIG. 2, some examples of the system 108 may include a location update component 222 configured to update the respective location-related data associated with the access points 104 and/or the stations 106, for example, as two or more of the access points 104 and/or the stations 106 exchange ranging data, for example, as described herein. In some examples, location update component 222 may include a location model 224, and execution of the location model 224 may result in updating the location-related data associated with one or more of the access points 104 and/or one or more of the stations 106, for example, as described herein. In some examples, the location model 224 may include an analytical model configured to update the location-related data, for example, based on exchanges of data between the access points 104 and/or the stations 106. In some examples, the location model 224 may include a machine-learning-trained analytical model. For example, the computer system(s) 202 may include, and/or be in communication with, a machine learning engine 226 configured to use training data 228 to improve the ability of the system 108 to determine the respective location-related data associated with the access points 104 and/or the stations 106, for example, as described herein. For example, the training data 228 may be generated through repeated determinations of the location-related data associated with the assess points 104 and/or the stations 106.

In some examples, the machine learning engine 226 may be part of, or incorporated into, a machine learning network, which may execute any one or more machine learning algorithms, such as, for example, neural networks. A neural network may be a biologically inspired algorithm, which passes input data through a series of connected layers to produce an output. One example of a neural network is the convolutional neural network (CNN). Each layer in a CNN may also include another CNN, or may include any number of layers. A neural network may utilize machine learning, which is a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees)), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

In some examples, more than one type of machine learning network may be used to provide respective results for each of the types of machine learning used. In some examples, a confidence score may be associated with each of the results, and the result relied on may be based at least in part on the confidence score associated with the result. For example, the result associated with the highest confidence score may be selected over other results, or the results may be combined based on the confidence scores, for example, based on statistical methods, such as weighted averages, etc.

As shown in FIG. 2, the computer system(s) 202 may include, and/or access, a data store 230. The data store 230 may include a file store including data associated with one or more of the access points 104, data associated with the locations of the one or more access points 104, data associated with one or more of the stations 106, data associated with one or more of the locations of the stations 106, and/or associated with the geographic area 102.

FIG. 3 illustrates an example environment 300 including an example geographic area 302 including a plurality of access points 104, an example station STA1, and an example auto-location component 110 of a system 108 for performing a process for identifying edge access points from among a plurality of access points 104 in the geographic area 302. The environment 300 and the geographic area 302 may correspond to the environment 100 and geographic area 102 shown in FIG. 1. FIG. 3 includes a block diagram showing example processes 300 for identifying edge access points from among a plurality of access points 104 located in the geographic area 302.

As shown in FIG. 3, identifying, via the auto-location component 110, from among a plurality of access points 104 in the geographic area 302 in communication with one or more networks, a plurality of edge access points may include, at 306, identifying access points having a minimum number of neighbor access points. In some examples, this may include determining a number of neighbor access points for at least some of the plurality of access points 104, and identifying as edge access points, access points 104 having a minimum number of neighbor access points. For example, it would be expected that access points at an edge of the geographic area 302 (e.g., a building) will have a relatively lower count of neighbor access points than access points in an interior region of the geographic area 302. In some examples, the auto-location component 110 may be configured to determine the number of neighbor access points for one or more of the access points 104 located in the geographic area 302. In some examples, this may be performed by an auto-location component (e.g., an auto-location engine) operating on Connected Mobile Experience™ (CMX) (and/or any other engine configured to determine station and/or access point locations and/or represent at least some of the locations on a map), which may be configured to collect data associated with the access points and detect access points at the edge of the geographic location, such as the periphery of the interior of a building.

In some examples, determination of whether an access point 104 is a neighbor access point relative to another access point may be based on the signal strength of signals communicated between two access points 104. For example, if the signal strength is greater than or equal to a threshold signal strength, then the two access points 104 may be determined to be neighbor access points relative to one another. In contrast, if the signal strength is below the threshold signal strength, it may be determined that the access points are not neighbor access points relative to one another.

FIG. 3 shows an example of a plurality of access points AP1 through APn, along with representations showing the number of neighbor access points 104 relative to each of the access points 104. In the example shown, the access points AP1, AP2, AP3, AP4, AP6, AP7, AP10, AP13, and AP14 are edge access points located around the periphery of the interior of the geographic area 302. In the example shown, each of the edge access points has three or fewer neighbors. FIG. 3 also shows interior access points AP5, AP8, AP9, and AP12, which are not edge access points. Each of the interior access points, in contrast to the edge access points, has four or more neighbors. Thus, in some examples, the edge access points may be distinguished from the interior access points by a statistical analysis of the number of neighbor access points for each of the access points, and identifying as edge access points those access points that are statistically more likely to be edge access points. In some examples, one or more of the access points 104 and/or one or more of the stations 106 may include a sensor configured to generate sensor data indicative of an altitude of the respective access point and/or the respective station. In some such examples, the sensor may include a barometric measuring device. In some such examples, one or more signals generated by the sensor may be used to determine whether the access points 104 are located on the same level as one another (e.g., on the same floor of a multi-floor building). In some examples, access points 104 that are not on the same level may be considered as not being neighbor access points relative to one another.

In some examples, at 308, the edge access points may be identified as access points of the plurality of access points 104 that are first to detect a presence of an access point 104 and/or a station 106. For example, one or more of the access points 104 may be configured to report detected probe requests from other access points 104 and/or one or more stations 106, and the detected media access control (MAC) addresses may be recorded along with the MAC address of the reporting access point. In some such examples, if the MAC address has already been detected by another access point, the reporting access point may be determined to not be an edge access point. For example, as a station 106 enters a building, it would be expected to be first detected by an edge access point rather than an interior access point.

In some examples, the auto-location component 110 may be configured to mitigate or eliminate false determinations of edge access points. For example, although one or more of the stations 104 may not change MAC addresses for each scan iteration, some at least some stations may change local MAC addresses at time intervals, thereby potentially creating an appearance of a MAC address that has not been previously detected. In some examples, the auto-location component 110 may be configured to determine at least some such false positives at least because MAC address rotation intervals may be different from the access point-to-access point roaming speed over more than two access points, and the MAC address rotation may either be seen several times within a single cell or may occur over more than one cell, at least in some instances potentially rendering outliers easily identifiable.

In another example of potentially inaccurately identifying edge access points, access points on non-entry levels (e.g., on upper floors of a multi-floor building) may detect probes from MAC addresses that may have already been detected by ground level access points. In some instances, however, without first being detected on a ground-level, a station may appear on a non-ground level, for example, when a building includes a parking garage, and an elevator or stairway provides direct access to a non-ground level (e.g., an upper floor of a building) and/or non-ground levels are part of a different network than a network on a ground-level. In some such instances, in stations that include a GPS, a GPS signal communicated to the access points may be stale and/or unavailable, and a response to a prompt by the access point (e.g., an LCI exchange) may fail. In some such examples, the auto-location component 110 may be configured to account for this and determine that the access point is not an edge access point, even though it is the first access point on a given level to detect the station. In some examples, an at least similar technique may be used to identify false edge access points when a geographic area has an invented edge, for example, where the access points that surround an edge of the geographic area have more neighbor access points than at least some other access points, the station appears as a central point. In some such examples, the auto-location component 110 may be configured to switch from one model to another upon detection of such an entry point.

In some examples, the process identifying the edge access points 304 may include a combination of both 306 and 308. In some examples, the process 300 for identifying edge access points 304 may include identifying as edge access points, access points that lack neighbor access points in an at least one-hundred-eighty-degree area surrounding the access point, for example, as shown in FIG. 3. For example, access point AP4 shown in FIG. 3 has three neighbor access points 104 (AP3, AP5, and AP9), and is an edge access point. As shown, the access point AP4 does not have any neighbor access points in an at least one-hundred-eighty-degree area 312 surrounding the access point AP4. In some examples, a constellation map may be created for one or more of the access points 104, and the result of the constellation computation may directly translate into respective positions of the access points 104. An access point neighbor proximity and orientation graph may be used to detect access points that do not have a neighbor access point in two or more of four quadrants, for example, such that edge access points do not have a neighbor access point in a one-hundred-eighty-degree or larger area. In some examples, 310 may use a standard indoor path loss model available in CMX and may perform reverse path loss to translate RSSI into distance metrics. In some examples, an alternate method may be to use FTM to perform access point-to-access point distance computation and incorporate the distance computation directly into an access point neighbor graph. In some examples, the process 300 for identifying edge access points 304 may include both 306 and 310, or may substitute 306 with 310.

Figure 4:
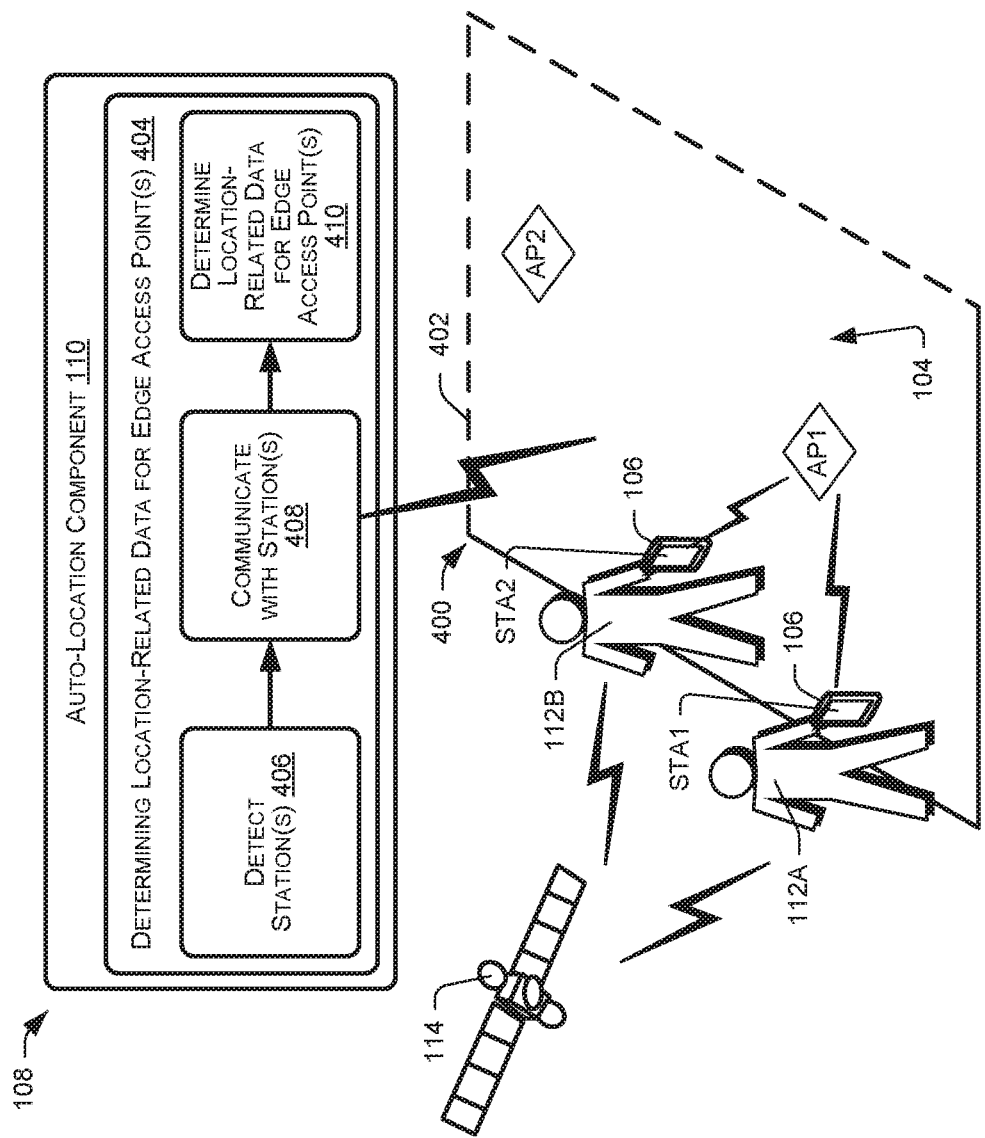
FIG. 4 illustrates an example environment including an example geographic area including two edge access points of the geographic area, two example stations communicating with one of the edge access points, and an example auto-location component of a system for performing example processes for determining location-related data for the edge access point.

FIG. 4 illustrates an example environment 400 including an example geographic area 402 including two edge access points 104 (e.g., AP1 and AP2) of the geographic area 402, two example stations STA1 and STA2 communicating with one of the edge access points 104 (i.e., AP1), and an example auto-location component 110 of a system 108 for performing example processes for determining location-related data for one of the edge access points 104. The environment 400 and the geographic area 402 may correspond to the environment 100 and geographic area 102 shown in FIG. 1. FIG. 4 includes a block diagram showing an example process 404 for determining location-related data for one or more of the edge access point(s), for example, edge access point AP1. For example, the process 404 may include, at 406, detecting, via the edge access point AP1, a presence of the first station STA1, which may be a station configured to communicate with at least some of the plurality of access points 104. At 408, the process 404 may include initiating, via the edge access point AP1, communication with the first station STA1. In some examples, at 408, the process 404 may also include determining ranging data indicative of a relative distance between the first station STA1 and the edge access point AP1. In some examples, the ranging data may be based at least in part on FTM.

For example, the first station STA1 may be an FTM-enabled station, which may be detected by the edge access point AP1 and/or the edge access point AP2, for example, upon entering the geographic area 402. In some examples, the edge access point AP1 may initiate a ranging exchange and retrieve location-related data associated with the first station STA1, which may include LCI. In some such examples, the edge access point AP1 may be configured to communicate the ranging data including the LCI to the auto-location component 110, for example, which may add data associated with the ranging exchange to the training data 228 (FIG. 2). In some examples, if the first station STA1 does not include LCI, the edge access point AP1 may be configured to ignore the ranging data received from the first station STA1, and continue detecting stations 106. In some examples, the station 106 may be an FTM-enabled station, and the LCI may include current GPS data (and/or other location data) associated with the respective station 106. In some examples, the station 106 may be an FTM-plus-enabled station 106, and the ranging data may include an LCI field including a confidence level and/or a timestamp indicative of, for example, a time interval that has elapsed since the LCI and/or the GPS data was transmitted. The confidence level may be indicative of an expected accuracy of the LCI and/or GPS data. In some examples, the access point 104 may include a sensor (e.g., a barometer) configured to generate one of more signals indicative of the elevation of the access point 104, for example, as described herein, and may be used to determine the level of a building on which the access point is located.

Some stations 106 may be include GPS hardware having an accuracy on the order of about ten meters. Some stations 106 may include relatively higher accuracy GPS hardware (e.g., L5-enabled GPS hardware) that may have an accuracy ranging from about one to about three meters. Some stations 106 may incorporate post-processing procedures with ground amplifiers (e.g., BeiDou™) and may have an accuracy of about one meter or less. In some example stations 106, once the GPS signal count falls below the minimum threshold accuracy level, which may be a hardware-dependent limit, some stations 106 may extrapolate changes in location based on sensors, such as, for example, accelerometers, gyroscopes, and/or inertial measurement units incorporated into the station 106. In some such examples, location-related data associated with the station 106 may continue to be determined, but with a decreasing confidence level associated with the accuracy of location-related data determination. The confidence level may represent a summation of such considerations.

In some examples, as more stations 106 enter the geographic area 402, location-related data may be determined for the edge access points 104. In some examples, the location related data may include relative distances to respective stations 104 and confidence levels associated with the respective relative distances. One or more of the access points 104 (e.g., the edge access points 104) may use this data to determine its respective access point location-related data (e.g., its LCI and confidence level), for example, as described with respect to FIGS. 5-7

Figure 5:
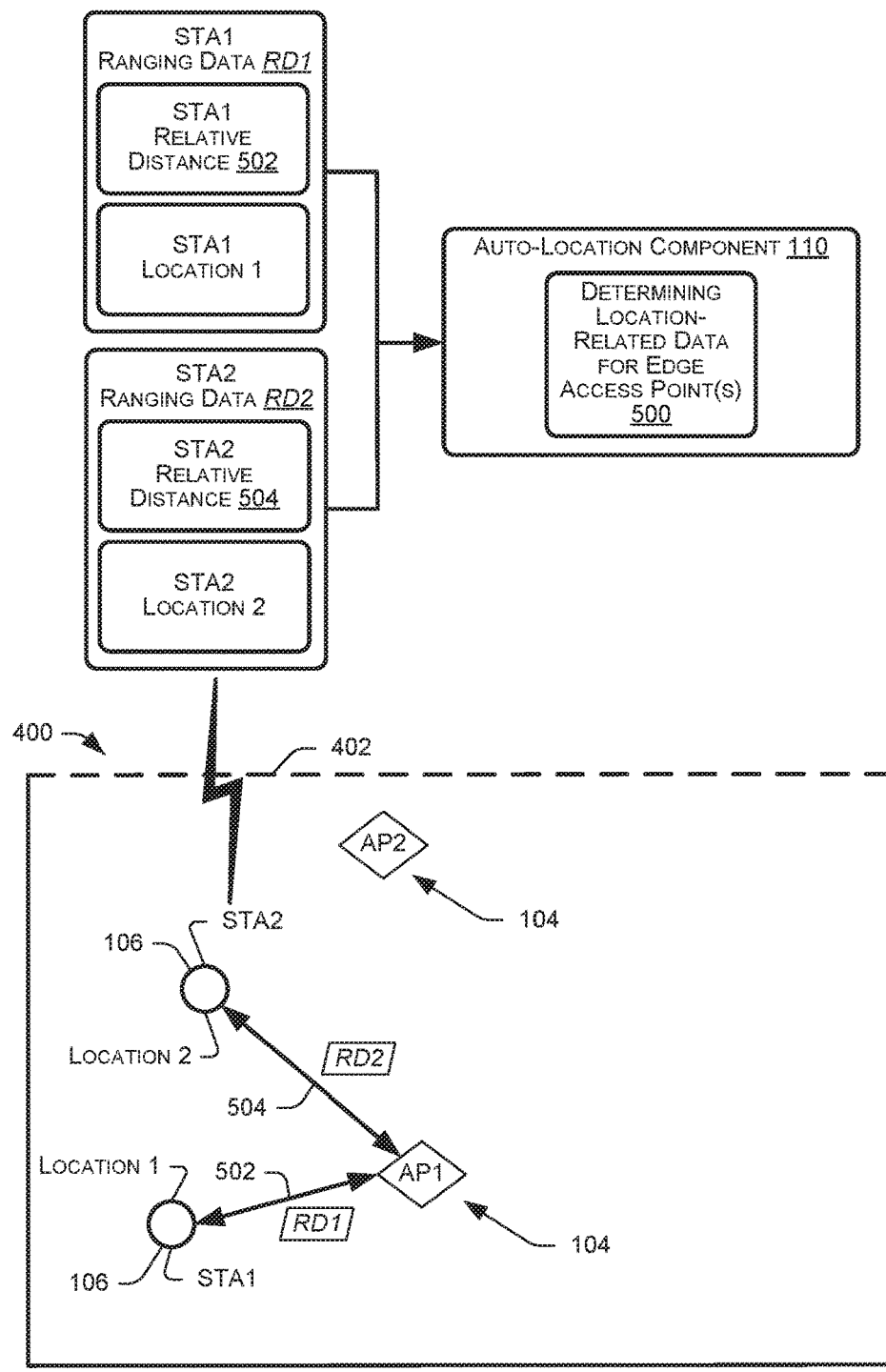
FIG. 5 illustrates the example environment shown in FIG. 4 including one of the edge access points exchanging ranging data with the two stations, and a block diagram showing an example of using ranging data exchanges to determine location-related data for the edge access point.

FIG. 5 illustrates the example environment 400 shown in FIG. 4 including one of the edge access points 104 (e.g., AP1) exchanging ranging data with first and second stations STA1 and STA2, and a block diagram showing an example process 500 using ranging data exchanges to determine location-related data for the edge access point AP1. As shown in FIG. 5, the first station STA1 is detected by the access point AP1 as the first station STA1 enters the geographic area 402 (e.g., a building). The access point AP1 may initiate a ranging exchange and retrieve ranging data RD1 associated with the first station STA1, which may include LCI. In some such examples, the edge access point AP1 may be configured to communicate the ranging data RD1 including the LCI to the auto-location component 110. As shown in FIG. 5, the ranging data RD1 associated with the first station STA1 may include the relative distance 502 between the first station STA1 and the edge access point AP1 and the location 1 of the first station STA1. Similarly, the second station STA2 may be detected by the access point AP1 as the second station STA2 enters the geographic area 402. The access point AP1 may initiate a ranging exchange and retrieve ranging data RD2 associated with the second station STA2, which may include LCI. In some such examples, the edge access point AP1 may be configured to communicate the ranging data RD2 including the LCI to the auto-location component 110. As shown in FIG. 5, the ranging data RD2 associated with the second station STA2 may include the relative distance 504 between the second station STA2 and the access point AP1 and the location 2 of the second station STA2.

Figure 6:
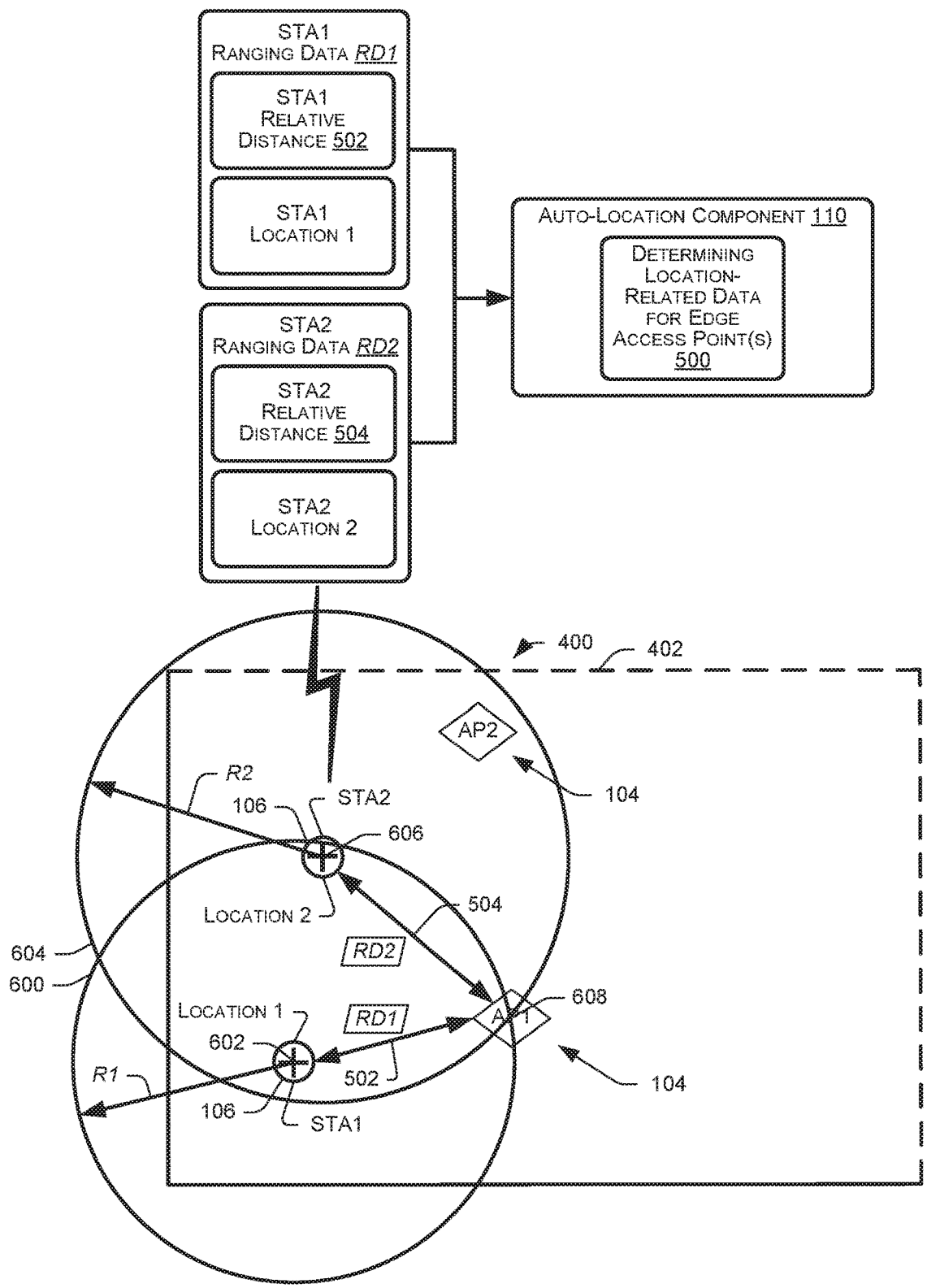
FIG. 6 illustrates the example environment shown in FIGS. 4 and 5 showing an example process for using the ranging data exchanges to determine location-related data for the edge access point.

FIG. 6 illustrates the example environment 400 shown in FIGS. 4 and 5 showing an example process 500 for using the ranging data exchanges to determine location-related data for the edge access point AP1. For example, the process 500 may include determining a first circle 600 having a first center 602 at least partially defined by location 1 associated with the first station STA1 and a first radius R1 at least partially defined by the first station relative distance 502. The process 500 may also include determining a second circle 604 having a second center 606 at least partially defined by the location 2 associated with the second station STA2 and a second radius R2 at least partially defined by the second station relative distance 504. The process 500 may also include identifying as the first edge access point location an intersection 608 of the first circle 600 and the second circle 604 with one another.

FIG. 7 illustrates the example environment 400 shown in FIGS. 4-6, and another example of the process 500 for using the ranging data exchanges to determine location-related data 700 for the edge access point AP1, wherein the ranging data RD1 and RD2 includes confidence levels and timestamps associated with the respective ranging data. For example, as show in FIG. 7, the location-related data associated with the first station STA1 (e.g., the ranging data RD1), in addition to including the relative distance 502 and the location 1 associated with the first station STA1, includes a confidence level 702 associated with the accuracy of the location 1 of the first station STA1 and a timestamp 704 associated with the first station STA1, for example, as described herein. In addition, the location-related data associated with the second station STA2 (e.g., the ranging data RD2), in addition to including the relative distance 504 and the location 2 associated with the second station STA2, includes a confidence level 706 associated with the accuracy of the location 2 of the second station STA2 and a timestamp 708 associated with the second station STA2, for example, as described herein. In some such examples, the process 500 may also include determining, based at least in part on the first confidence level 702 and/or the second confidence level 706, a confidence level 710 associated with the accuracy of the location-related data 700 associated with the edge access point AP1, including, for example, the location 712 of the access point AP1.

As shown in FIG. 7, in some examples of the process 500, the first circle 600 may include a first inner radius RI1 and a first outer radius RO1 at least partially indicative of the confidence level 702 associated with the location-related data associated with the first station STA1. Similarly, in some examples, the second circle 604 may include a second inner radius RI2 and a second outer radius RO2 at least partially indicative of the confidence level 706 associated with the location-related data associated with the second station STA2. The difference between the inner radius and the outer radius may be indicative of the confidence level, for example, with relatively greater differences being indicative of a relatively lower confidence level. For example, as shown in FIG. 7, the confidence level associated with the first circle 600 would be expected to be relatively higher that the confidence level associated with the second circle 604 due to the greater difference between the second outer radius RO2 and the second inner radius RI2, relative to the difference between the first outer radius RO1 and the first inner radius RI1.

In some examples, the process 500 may include identifying as the edge access point AP1 location 712 an intercept centroid 714 with respect to the first circle 600 and the second circle 604, for example, as shown in FIG. 7. In this example manner, the process 500, in some examples, may account for the confidence level associated with determining the locations of respective access points 104, including edge access points and/or interior access points. In some examples, one or more of the access points 104 may be configured to determine its own location-related data, including its location and a corresponding confidence level associated the respective location.

FIG. 8 illustrates an example environment 800 including an example geographic area 802 including a plurality of access points 104 exchanging ranging data RD between neighbor access points 104 and a block diagram of an example process 804 for updating location-related data associated with at least some of the access points 104 based on the exchange of ranging data RD. For example, the process 804, at 806, includes exchanging ranging data RD between neighbor access points 104. In some examples, the ranging data may include access point locations 808, relative locations between neighbor access points 810, and/or confidence levels 812 associated with the ranging data for one or more of the access points 104. In some such examples, the process 804 may include determining updated location-related data 814 for one or more of the access points 104. For example, the process 804 may include determining location-related data for a plurality of the edge access points 104 and associating respective confidence levels 808 for each of the plurality of edge access points 104. Similarly, the process 804 may include determining location-related data for a plurality of interior access points 104 and associating respective confidence levels for each of the plurality of interior access points 104. In addition, the process 804 may include updating at least some of the location-related data associated with the edge access points and/or the interior access points 104, for example, to improve at least some of the respective confidence levels 812. In some examples, the process 804 may also include, over time, exchanging additional ranging data indicative of additional relative distances between at least some pairs of the plurality of access points 104, and determining, based at least in part on the additional ranging data and/or the additional location-related data, updated location-related data for at least some of the access points 104 (e.g., the edge access points and/or the interior access points). In some examples, the updating may be performed by the location model 224 (see FIG. 2), which, in some examples, may be an analytical model trained by a machine learning engine 226, for example, using the training data 228.

In some examples, as repeated ranging data exchanges take place between the stations 106 and the access points 104 and/or between neighboring access points 104, the accuracy of the location-related data for each access point pair of the exchanges may also increase. In some examples, once the confidence levels for an access point pair reaches a threshold confidence level, access points that include LCI may be caused to skip the ranging exchange with access points that also have an LCI associated with a high confidence level.

As the ranging data exchanges between access points continue, it is possible that conflicting information may be identified from LCI computations originating from different edge access points 104. In such examples, the confidence level of the computing access point may decrease accordingly. Because inaccuracies may affect input from more than two access point neighbors, in some examples, the system may be configured to execute a minimum mean square error (MMSE) process and/or any other error reduction methods to reconcile the LCI information and the associated confidence levels, such as, for example, any Euclidian Distance Matrix (EDM) resolution technique, etc.

In some examples, once the exchanges have been terminated, each access point of a given level of the area (e.g., on a common floor of a building) may have location-related data (e.g., an LCI) associated with a reliable confidence level. In addition, the location-related data may be leveraged by the system (e.g., by CMX) to automatically locate the access points 104 on one or more maps, for example, for which an initial geo-marker was placed.

In some examples, the process 804 may also include automatically determining, via the auto-location component 110, location-related data for one or more of the access points 104 upon relocation of the one or more access points 104. Further, in some examples, the process 804 may also include automatically determining, via the auto-location component 110, location-related data for one or more of additional access points added to the access points 104. In this example manner, the system 108 may be self-healing in that by exchanging ranging data, relocated access points may be automatically detected in respective new locations and/or newly added access points may be detected in their respective locations. For example, any access point that is relocated may trigger a reduction in confidence level when moved from its initial location, and determination of new location-related data when relocated to its new location. In addition, any access point added to the area may generate an access point pair where one access point (e.g., the newly added access point) has no location-related data, which may trigger other access points to initiate ranging data exchanges, thus resulting in determining the location-related data for the new access point.

Figure 9A:
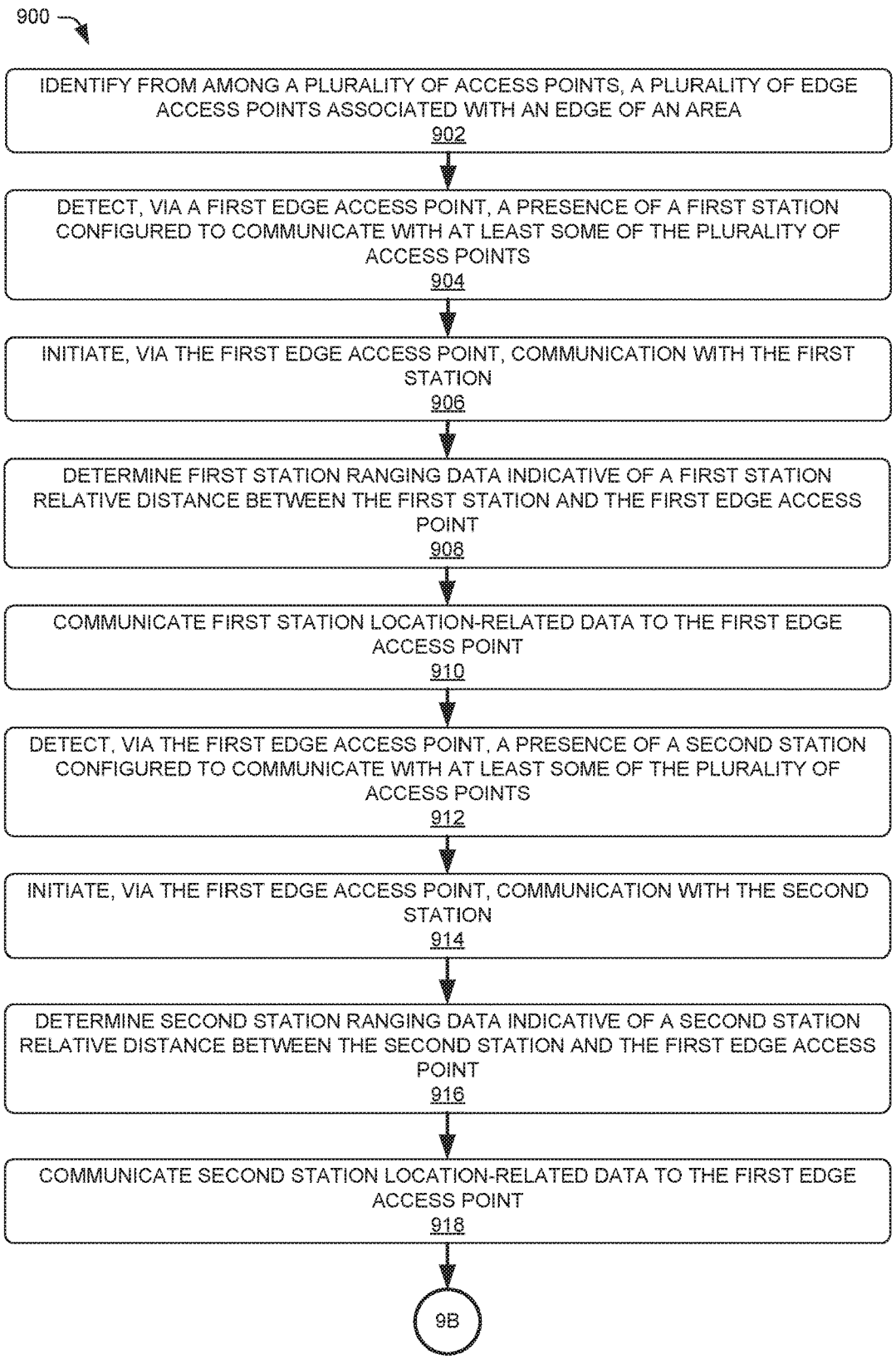
FIG. 9A and FIG. 9B illustrate a flow diagram of an example process for determining locations for at least some access points in a geographic area and updating the locations based at least in part on confidence levels associated with the locations.
Figure 9B:
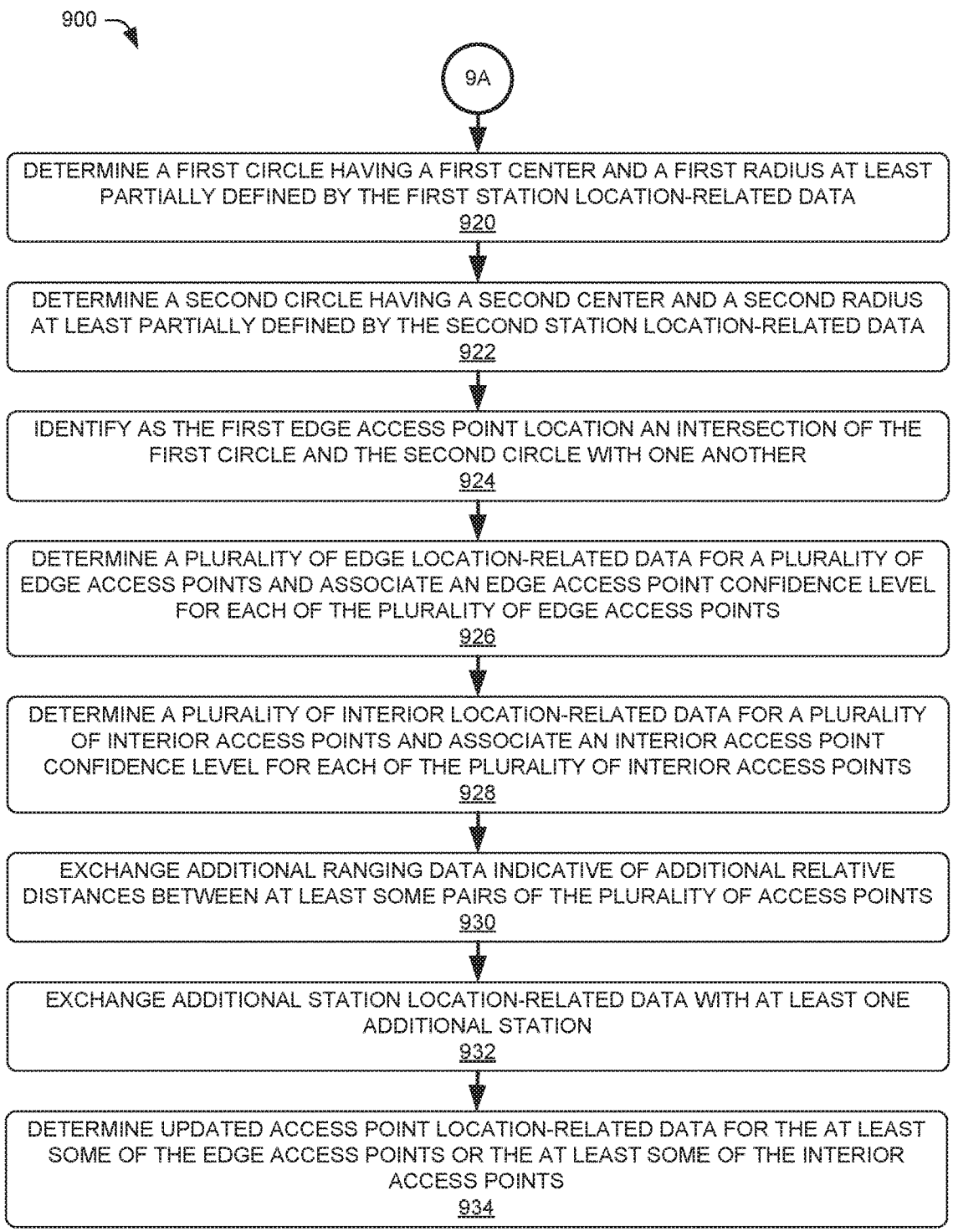

FIG. 9A and FIG. 9B collectively illustrate a flow diagram of an example process 900 for determining location-related data for a plurality of access points located in a geographic area in communication with a network. This process is illustrated as a logical flow graph, operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the process.

As noted above, FIG. 9A and FIG. 9B collectively illustrate a flow diagram of an example process 900 for determining location-related data for a plurality of access points located in a geographic area in communication with a network. As shown in FIG. 9A, an operation 902 represents identifying from among a plurality of access points, a plurality of edge access points associated with an edge of an area. For example, an auto-location component may be configured to identify edge access points by, for example, identifying as edge access points, access points having a minimum number of neighbor access points and/or identifying as edge access points, access points that are first to detect a presence of a station configured to communicate with at least some of the of access points identifying. In some examples, identifying edge access points may include identifying access points that lack neighbor access points in an at least one-hundred-eighty-degree area surrounding the access point.

An operation 904 represents detecting, via a first edge access point, a presence of a first station configured to communicate with at least some of the plurality of access points, for example, as described herein with respect to FIGS. 4-7. For example, an operation 906 represents initiating, via the first edge access point, communication with the first station, and an operation 908 represents determining first station ranging data indicative of a first station relative distance between the first station and the first edge access point. This, in some examples, may be based on FTM. An operation 910 represents communicating first station location-related data to the first edge access point, for example, as described herein with respect to FIGS. 5-7. As explained herein, this may, in some examples, include LCI.

An operation 912 represents detecting, via the first edge access point, a presence of a second station configured to communicate with at least some of the plurality of access points, for example, as described herein with respect to FIG. 5-7. For example, an operation 914 represents initiating, via the first edge access point, communication with the second station, and an operation 916 represents determining second station ranging data indicative of a second station relative distance between the second station and the first edge access point, for example, as described herein with respect to FIGS. 5-7. An operation 918 represents communicating second station location-related data to the first edge access point.

FIG. 9B continues the illustration of the process 900 and includes, at an operation 920, determining a first circle having a first center and a first radius at least partially defined by the first station location-related data, for example, as described herein with respect to FIGS. 6 and 7. An operation 922 represents determining a second circle having a second center and a second radius at least partially defined by the second station location-related data. An operation 924 represents identifying as the first edge access point location an intersection of the first circle and the second circle with one another.

An operation 926 represents determining a plurality of edge location-related data for a plurality of edge access points and associating an edge access point confidence level for each of the plurality of edge access points, for example, as described herein with respect to FIG. 8. An operation 928 represents determining a plurality of interior location-related data for a plurality of interior access points and associating an interior access point confidence level for each of the plurality of interior access points, for example, as described herein with respect to FIG. 8.

An operation 930 represents exchanging additional ranging data indicative of additional relative distances between at least some pairs of the plurality of access points, and an operation 932 represents exchanging additional station location-related data with at least one additional station.

An operation 934 represents determining updated access point location-related data for at least some of the edge access points or at least some of the interior access points, for example, as described herein with respect to FIG. 8.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 1, 3-8, 9A, and 9B, and as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 10:
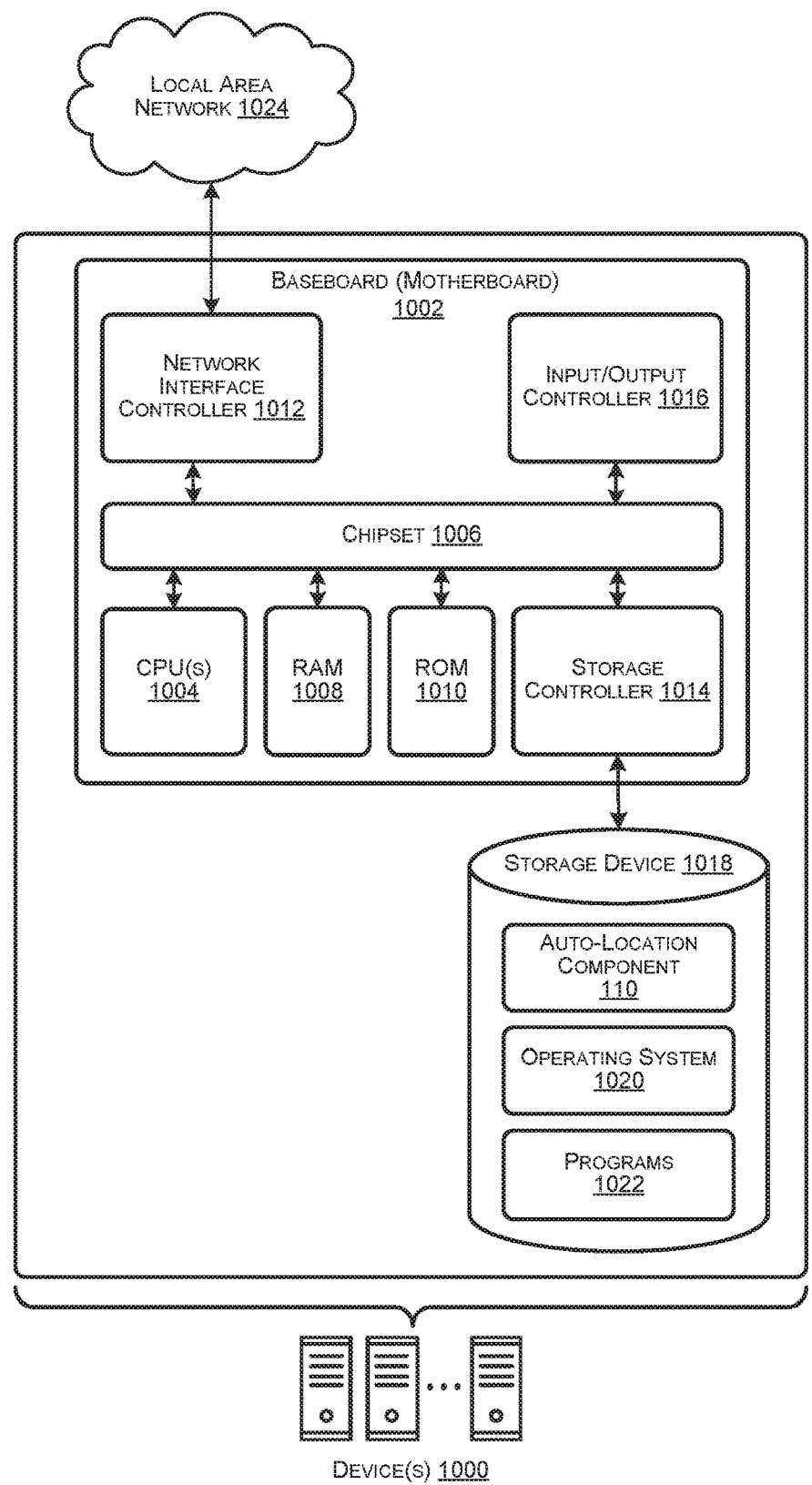
FIG. 10 is a computer architecture diagram showing an illustrative computer hardware architecture for implementing devices that may be used to implement aspects of the various technologies presented herein.

FIG. 10 is a computer architecture diagram showing an illustrative computer hardware architecture for implementing one or more devices 1000 that may be utilized to implement aspects of the various technologies presented herein. The auto-location component 110, discussed above, may include some or all of the components discussed below with reference to the device 1000.

As mentioned above, the computing resources provided by a cloud computing network, data center, or the like can be data processing resources such as VM instances or hardware computing systems, database clusters, computing clusters, storage clusters, data storage resources, database resources, networking resources, and others. Some of the device(s) 1000 can also be configured to execute a resource manager capable of instantiating and/or managing the computing resources. In the case of VM instances, for example, the resource manager can be a hypervisor or another type of program configured to enable the execution of multiple VM instances on a single server device 1000. Device(s) 1000 in a data center may also be configured to provide network services and other types of services.

The device(s) 1000 include a baseboard 1002, or "motherboard," which is a printed circuit board to which a multitude of components or devices can be connected by way of a system bus or other electrical communication paths. In one illustrative configuration, one or more central processing units (CPUs) 1004 operate in conjunction with a chipset 1006. The CPU(s) 1004 can be standard programmable processors that perform arithmetic and logical operations necessary for the operation of the device(s) 1000.

The CPU(s) 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPU(s) 1004 and the remainder of the components and devices on the baseboard 1002. The chipset 1006 can provide an interface to a RAM 1008, used as the main memory in the device(s) 1000. The chipset 1006 can further provide an interface to a computer-readable storage medium such as a read-only memory (ROM) 1010 or non-volatile RAM (NVRAM) for storing basic routines that help to startup the device(s) 1000 and to transfer information between the various components and devices. The ROM 1010 or NVRAM can also store other software components necessary for the operation of the device(s) 1000 in accordance with the configurations described herein.

The device(s) 1000 can operate in a networked environment using logical connections to remote computing devices and computer systems through a network, such as a local area network 1024. The chipset 1006 can include functionality for providing network connectivity through a Network Interface Card (NIC) 1012, such as a gigabit Ethernet adapter. The NIC 1012 is capable of connecting the device(s) 1000 to other computing devices over the network. It should be appreciated that multiple NICs 1012 can be present in the device(s) 1000, connecting the computer to other types of networks and remote computer systems.

The device(s) 1000 can be connected to a storage device 1018 that provides non-volatile storage for the computer. The storage device 1018 can store an operating system 1020, programs 1022, and data, which have been described in greater detail herein. The storage device 1018 can be connected to the device(s) 1000 through a storage controller 1014 connected to the chipset 1006. The storage device 1018 can consist of one or more physical storage units. The storage controller 1014 can interface with the physical storage units through a serial attached SCSI (SAS) interface, a serial advanced technology attachment (SATA) interface, an FC interface, or other type of interface for physically connecting and transferring data between computers and physical storage units.

The device(s) 1000 can store data on the storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1018 is characterized as primary or secondary storage, and the like.

For example, the device(s) 1000 can store information to the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The device(s) 1000 can further read information from the storage device 1018 by detecting the physical states or characteristics of one or more particular locations within the physical storage units.

In addition to the mass storage device 1018 described above, the device(s) 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the device(s) 1000.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1018 can store an operating system 1020 utilized to control the operation of the device(s) 1000. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants, and/or MacOS™. It should be appreciated that other operating systems can also be utilized. The storage device 1018 can store other system or application programs and data utilized by the device(s) 1000.

In one embodiment, the storage device 1018 or other computer-readable storage media is encoded with computer-executable instructions which, when loaded into the device(s) 1000, transform the computer from a general-purpose computing system into a special-purpose computer capable of implementing the embodiments described herein. These computer-executable instructions transform the device(s) 1000 by specifying how the CPUs 1004 transition between states, as described above. According to one embodiment, the device(s) 1000 may have access to computer-readable storage media storing computer-executable instructions which, when executed by the device(s) 1000, may perform the various processes described above with regard to FIGS. 1-9B. The device(s) 1000 can also include computer-readable storage media having instructions stored thereupon for performing any of the other computer-implemented operations described herein.

The device(s) 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the device(s) 1000 might not include all of the components shown in FIG. 10, can include other components that are not explicitly shown in FIG. 10, or might utilize an architecture completely different than that shown in FIG. 10.

The device(s) 1000 may also store, in the storage device 1018, the auto-location component 110 for performing some or all of the techniques described above with reference to FIGS. 1-9B.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A system comprising:
    one or more processors; and
    one or more non-transitory computer-readable media storing computer-executable instructions that, when executed by the one or more processors, cause the one or more processors to perform acts comprising:
        identifying, via an auto-location component, from among a plurality of access points in an area in communication with a network, a plurality of edge access points associated with an edge of the area;
        determining first edge location-related data for a first edge access point of the plurality of edge access points; and
        determining first interior location-related data for a first interior access point of the plurality of access points, the first interior access point being interior to the edge access points within the network,
        wherein determining the first interior location-related data for the first interior access point comprises:
            exchanging ranging data indicative of a first relative distance between the first edge access point and the first interior access point, the ranging data based at least in part on at least one of fine timing measurements or time-of-flight-based measurements; and
            communicating the first edge location-related data from the first edge access point to the first interior access point.

2. The system of claim 1, the acts further comprising determining at least one of:
    second edge location-related data for a second edge access point of the plurality of edge access points; or
    second interior location-related data for a second interior access point of the plurality of access points.

3. The system of claim 1, wherein identifying the plurality of edge access points associated with the edge of the area comprises at least one of:
    determining a number of neighbor access points for at least some of the plurality of access points, and identifying as edge access points, from among the at least some of the plurality of access points, access points having a minimum number of neighbor access points;
    identifying, from among at least some of the plurality of access points, as edge access points, access points that are first to detect a presence of a station configured to communicate with at least some of the plurality of access points; or
    identifying, from among at least some of the plurality of access points, as edge access points, access points that lack neighbor access points in an at least one-hundred-eighty-degree area surrounding the access point.

4. The system of claim 1, wherein determining the first edge location-related data for the first edge access point of the plurality of edge access points comprises:
    detecting, via the first edge access point, a presence of a first station configured to communicate with at least some of the plurality of access points, the first station comprising a mobile device;
    initiating, via the first edge access point, communication with the first station;
    determining first station ranging data indicative of a first station relative distance between the first station and the first edge access point, the first station ranging data based at least in part on at least one of fine timing measurements or time-of-flight-based measurements; and
    communicating first station location-related data to the first edge access point, the first station location-related data comprising at least one of a first station location of the first station, a first confidence level associated with an accuracy of the first station location, or a first timestamp associated with a first time period between a determination time at which determination of the first station location occurred and a communication time at which the first station location-related data is communicated to the first edge access point.

5. The system of claim 4, the acts further comprising:
    detecting, via the first edge access point, a presence of a second station configured to communicate with at least some of the plurality of access points, the second station comprising a mobile device;
    initiating, via the first edge access point, communication with the second station;
    determining second station ranging data indicative of a second station relative distance between the second station and the first edge access point, the second station ranging data based at least in part on fine timing measurements; and
    communicating second station location-related data to the first edge access point, the second station location-related data comprising at least one of a second station location of the second station, a second confidence level associated with an accuracy of the second station location, or a second timestamp associated with a second time period between a determination time at which determination of the second station location occurred and a communication time at which the second station location-related data is communicated to the first edge access point.

6. The system of claim 5, wherein:
at least one of the first station location-related data comprises a first confidence level associated with the accuracy of the first station location or the second station location-related data comprises a second confidence level associated with the accuracy of the second station location; and
the acts further comprise determining, based at least in part on the at least one of the first confidence level associated with the accuracy of the first station location or the second confidence level associated with the accuracy of the second station location, a first edge access point confidence level associated with an accuracy of the first edge access point location.

7. The system of claim 5, the acts further comprising:
determining a first circle having a first center at least partially defined by the first station location and a first radius at least partially defined by the first station relative distance;
determining a second circle having a second center at least partially defined by the second station location and a second radius at least partially defined by the second station relative distance; and
identifying as the first edge access point location an intersection of the first circle and the second circle with one another.

8. The system of claim 7, wherein:
at least one of the first station location-related data comprises a first confidence level associated with the accuracy of the first station location or the second station location-related data comprises a second confidence level associated with the accuracy of the second station location; and
at least one of:
the first circle comprises a first inner radius and a first outer radius at least partially indicative of the first confidence level; or
the second circle comprises a second inner radius and a second outer radius at least partially indicative of the second confidence level.

9. The system of claim 8, wherein identifying as the first edge access point location the intersection of the first circle and the second circle with one another comprises identifying as the first edge access point location an intercept centroid with respect to the first circle and the second circle.

10. The system of claim 1, wherein:
determining the first edge location-related data for the first edge access point of the plurality of edge access points comprises:
detecting, via the first edge access point, a presence of a first station configured to communicate with at least some of the plurality of access points, the first station comprising a mobile device; and
detecting, via the first edge access point, a presence of a second station configured to communicate with at least some of the plurality of access points, the second station comprising a mobile device; and
the acts further comprise:
determining a plurality of edge location-related data for a plurality of edge access points and associating an edge access point confidence level for each of the plurality of edge access points;
determining a plurality of interior location-related data for a plurality of interior access points and associating an interior access point confidence level for each of the plurality of interior access points; and
updating at least some of the edge location-related data to improve at least some of the edge access point confidence levels and at least some of the interior location-related data to improve at least some of the interior access point confidence levels.

11. The system of claim 10, wherein the updating comprises at least one of:
exchanging additional ranging data indicative of additional relative distances between at least some pairs of the plurality of access points; or
exchanging additional station location-related data with at least one additional station; and
determining, based at least in part on at least one of the additional ranging data or the additional station location-related data, updated access point location-related data for the at least some of the edge access points or the at least some of the interior access points.

12. The system of claim 11, wherein the updating is performed via a machine-learning-trained analytical model.

13. The system of claim 4, wherein:
at least one of the first station or at least some of the plurality of access points comprises a sensor configured to generate sensor data indicative of an altitude of the at least one of the first station or the at least some of the plurality of access points; and
the acts further comprise determining, based at least in part on the sensor data, whether the at least one of the first station or the at least some of the plurality of access points are on a common floor of a building.

14. The system of claim 1, wherein the acts further comprise:
determining edge location-related data for located edge access points of at least some of the plurality of edge access points;
determining interior location-related data for located interior access points of a plurality of interior access points;
initiating exchange of ranging data between neighboring located edge access points, between located edge access points and neighboring located interior access points, and between neighboring located interior access points; and
updating, based at least in part on exchanged ranging data, location-related data for the plurality of edge access points and the plurality of interior access points.

15. The system of claim 14, the acts further comprising at least one of:
automatically determining, via the auto-location component, location-related data for one or more of the plurality of access points upon relocation of the one or more access points; or
automatically determining, via the auto-location component, location-related data for one or more of additional access points added to the plurality of access points.

16. A method for determining location-related data for a plurality of access points located in an area in communication with a network, the method comprising:
identifying, via an auto-location component, from among the plurality of access points, a plurality of edge access points associated with an edge of the area;
determining first edge location-related data for a first edge access point of the plurality of edge access points; and determining first interior location-related data for a first interior access point of the plurality of access points, the first interior access point being interior to the edge access points within the network,
wherein determining the first interior location-related data for the first interior access point comprises:
exchanging ranging data indicative of a first relative distance between the first edge access point and the first interior access point, the ranging data based at least in part on at least one of fine timing measurements or time-of-flight-based measurements; and
communicating the first edge location-related data from the first edge access point to the first interior access point.

17. The method of claim 16, wherein determining the plurality of edge access points associated with the edge of the area comprises at least one of:
determining a number of neighbor access points for at least some of the plurality of access points, and identifying as edge access points, from among the at least some of the plurality of access points, access points having a minimum number of neighbor access points;
identifying, from among at least some of the plurality of access points, as edge access points, access points that are first to detect a presence of a station configured to communicate with at least some of the plurality of access points; or
identifying, from among at least some of the plurality of access points, as edge access points, access points that lack neighbor access points in an at least one-hundred-eighty-degree area surrounding the access point.

18. The method of claim 16, wherein determining the first edge location-related data for the first edge access point of the plurality of edge access points comprises:
detecting, via the first edge access point, a presence of a first station configured to communicate with at least some of the plurality of access points, the first station comprising a mobile device;
initiating, via the first edge access point, communication with the first station;
determining first station ranging data indicative of a first station relative distance between the first station and the first edge access point, the first station ranging data based at least in part on at least one of fine timing measurements or time-of-flight-based measurements; and
communicating first station location-related data to the first edge access point, the first station location-related data comprising at least one of a first station location of the first station, a first confidence level associated with an accuracy of the first station location, or a first timestamp associated with a first time period between a determination time at which determination of the first station location occurred and a communication time at which the first station location-related data is communicated to the first edge access point.

19. The method of claim 16, wherein:
determining the first edge location-related data for the first edge access point of the plurality of edge access points comprises:
detecting, via the first edge access point, a presence of a first station configured to communicate with at least some of the plurality of access points, the first station comprising a mobile device; and
detecting, via the first edge access point, a presence of a second station configured to communicate with at least some of the plurality of access points, the second station comprising a mobile device; and
the method further comprises:
determining a plurality of edge location-related data for a plurality of edge access points and associating an edge access point confidence level for each of the plurality of edge access points;
determining a plurality of interior location-related data for a plurality of interior access points and associating an interior access point confidence level for each of the plurality of interior access points; and
updating at least some of the edge location-related data to improve at least some of the edge access point confidence levels and at least some of the interior location-related data to improve at least some of the interior access point confidence levels.

20. One or more non-transitory computer-readable media storing computer-executable instructions that, when executed, cause one or more processors to perform acts comprising:
identifying, via an auto-location component, from among a plurality of access points in an area in communication with a network, a plurality of edge access points associated with an edge of the area;
determining first edge location-related data for a first edge access point of the plurality of edge access points; and
determining first interior location-related data for a first interior access point of the plurality of access points, the first interior access point being interior to the edge access points within the network,
wherein determining the first interior location-related data for the first interior access point comprises:
exchanging ranging data indicative of a first relative distance between the first edge access point and the first interior access point, the ranging data based at least in part on at least one of fine timing measurements or time-of-flight-based measurements; and
communicating the first edge location-related data from the first edge access point to the first interior access point.

* * * * *